(12) United States Patent
Hwang (10) Patent No.: US 8,203,672 B2
(45) Date of Patent: Jun. 19, 2012

(54) COMPOSITE POLARIZING SHEET AND LIQUID CRYSTAL DISPLAY COMPRISING THE SAME

(75) Inventor: Seong-Yong Hwang, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 233 days.

(21) Appl. No.: 12/409,743

(22) Filed: Mar. 24, 2009

(65) Prior Publication Data

US 2009/0257002 A1 Oct. 15, 2009

(30) Foreign Application Priority Data

Apr. 11, 2008 (KR) .................. 10-2008-0033746

(51) Int. Cl.
*G02F 1/1335* (2006.01)

(52) U.S. Cl. .............. 349/96; 349/61; 349/62; 264/1.34

(58) Field of Classification Search .............. 349/65, 349/62, 96; 264/1.34

See application file for complete search history.

(56) References Cited

U.S. PATENT DOCUMENTS

| | | | |
|---|---|---|---|
| 5,600,455 A * | 2/1997 | Ishikawa et al. | 349/57 |
| 5,828,488 A * | 10/1998 | Ouderkirk et al. | 359/485.02 |
| 6,310,673 B1 * | 10/2001 | Sharp | 349/106 |
| 6,845,212 B2 * | 1/2005 | Gardiner et al. | 385/146 |
| 7,046,905 B1 * | 5/2006 | Gardiner et al. | 385/146 |
| 7,048,428 B2 * | 5/2006 | Tahara et al. | 362/626 |
| 7,072,544 B2 * | 7/2006 | Cornelissen et al. | 385/31 |
| 7,074,463 B2 * | 7/2006 | Jones et al. | 428/1.1 |
| 7,248,764 B2 * | 7/2007 | Park et al. | 385/36 |
| 7,553,057 B2 * | 6/2009 | Hwang et al. | 362/607 |
| 2005/0280752 A1 * | 12/2005 | Kim et al. | 349/62 |
| 2006/0215086 A1 * | 9/2006 | Kurasawa | 349/114 |
| 2006/0256581 A1 * | 11/2006 | Hwang et al. | 362/619 |
| 2006/0286396 A1 * | 12/2006 | Jonza | 428/480 |
| 2008/0151147 A1 * | 6/2008 | Weber et al. | 349/96 |
| 2008/0247192 A1 * | 10/2008 | Hoshi et al. | 362/627 |

FOREIGN PATENT DOCUMENTS

| | | |
|---|---|---|
| JP | 7049421 | 2/1995 |
| JP | 9506984 T | 7/1997 |
| KR | 100437064 | 6/2004 |

* cited by examiner

*Primary Examiner* — Edward Glick
*Assistant Examiner* — Sang Nguyen
(74) *Attorney, Agent, or Firm* — Cantor Colburn LLP

(57) ABSTRACT

A liquid crystal display ("LCD") includes an LCD panel including a polarizing plate disposed on at least one surface thereof, a light guide plate ("LGP") disposed below the LCD panel and including reflective patterns which reflect light incident on the LGP toward the LCD panel, and a composite polarizing sheet disposed between the LCD panel and the LGP and including; a surface layer having a plurality of prism patterns which extend in a first direction and which are arranged substantially parallel to each other, and a reflective polarizing layer having a transmission axis oriented in a second direction other than the first direction, wherein the second direction is one of substantially parallel to or perpendicular to a polarizing axis of the polarizing plate.

18 Claims, 11 Drawing Sheets

COMPOSITE POLARIZING SHEET AND LIQUID CRYSTAL DISPLAY COMPRISING THE SAME

This application claims priority to Korean Patent Application No. 10-2008-0033746, filed on Apr. 11, 2008, and all the benefits accruing therefrom under 35 U.S.C. §119, the contents of which in its entirety are herein incorporated by reference.

BACKGROUND OF THE INVENTION

1. Field of the Invention

The present invention relates to a composite polarizing sheet and liquid crystal display ("LCD") including the same, and more particularly, to a composite polarizing sheet and LCD including the same that can provide lower manufacturing costs and improved display quality.

2. Description of the Related Art

Due to the non-light-emitting nature of liquid crystals, a typical liquid crystal display ("LCD") includes an LCD panel and a backlight unit. The LCD panel typically includes a first substrate in which an electric-field generating electrode (e.g. a pixel electrode and/or a common electrode) is formed, a second substrate and a liquid crystal ("LC") layer interposed therebetween. The LCD displays images by applying voltages to the field-generating electrodes to generate an electric field in the LC layer, which determines orientations of LC molecules in the LC layer to adjust polarization of incident light through the LCD. The LCD panel itself includes non-emissive display devices, and a backlight unit provides light to the LCD panel. In general, a backlight unit includes a light source for generating light, a light guide plate ("LGP") which receives the light emitted from the light source and guides the same toward the LCD panel, one or more optical sheets for enhancing brightness and uniformity of light passing through the LGP, and a reflector sheet disposed below the LGP.

BRIEF SUMMARY OF THE INVENTION

In a liquid crystal display ("LCD"), light from the backlight unit may not be efficiently transmitted to the LCD panel. The loss of light may reduce the brightness of the LCD, thereby degrading the display quality. The use of optical sheets for the purpose of enhancing the brightness may increase the manufacturing cost.

The present invention provides a composite optical sheet that can provide low manufacturing costs and improved display quality. The present invention also provides an LCD that can provide low manufacturing costs and improved display quality. The above and other objects of the present invention will be described in or be apparent from the following description of the exemplary embodiments.

According to an aspect of the present invention, there is provided an exemplary embodiment of an LCD including; an LCD panel including a polarizing plate disposed on at least one surface thereof, a light guide plate ("LGP") disposed below the LCD panel and including reflective patterns which reflect light incident on the LGP toward the LCD panel, and a composite polarizing sheet disposed between the LCD panel and the LGP and including; a surface layer having a plurality of prism patterns which extend in a first direction and which are arranged substantially parallel to each other, and a reflective polarizing layer having a transmission axis oriented in a second direction other than the first direction, wherein the second direction is one of substantially parallel to or substantially perpendicular to a polarizing axis of the polarizing plate.

According to another aspect of the present invention, there is provided an exemplary embodiment of an LCD including; an LCD panel including a liquid crystal molecular layer, an LGP disposed below the LCD panel and having reflective patterns reflecting light incident on the LGP toward the LCD panel, and a composite polarizing sheet disposed between the LCD panel and the LGP and including; a surface layer having a plurality of prism patterns which extend in a first direction and are arranged substantially parallel to each other, and a reflective polarizing layer having a transmission axis extending in a second direction other than the first direction, wherein the second direction coincides with the direction in which liquid crystal molecules in the liquid crystal molecular layer closest to the composite polarizing sheet are aligned.

According to still another aspect of the present invention, there is provided an exemplary embodiment of a composite polarizing sheet including a surface layer having a plurality of prism patterns which extend in the first direction and are arranged substantially parallel to each other, and wherein the surface layer allows light passing therethrough to be oriented in a direction substantially normal thereto; and a reflective polarizing layer having a transmission axis extending in a second direction other than the first direction and which transmits light having a first polarization oriented in the second direction while reflecting light having second polarization oriented in a direction other than the second direction, wherein the second direction is parallel to a polarizing axis of a polarizing plate to which light is transmitted through the reflective polarizing layer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

An exemplary embodiment of a composite polarizing sheet and liquid crystal display ("LCD") 600 including the same according to the present invention will now be described in detail with reference to FIGS. 1 through 7.

Figure 1:
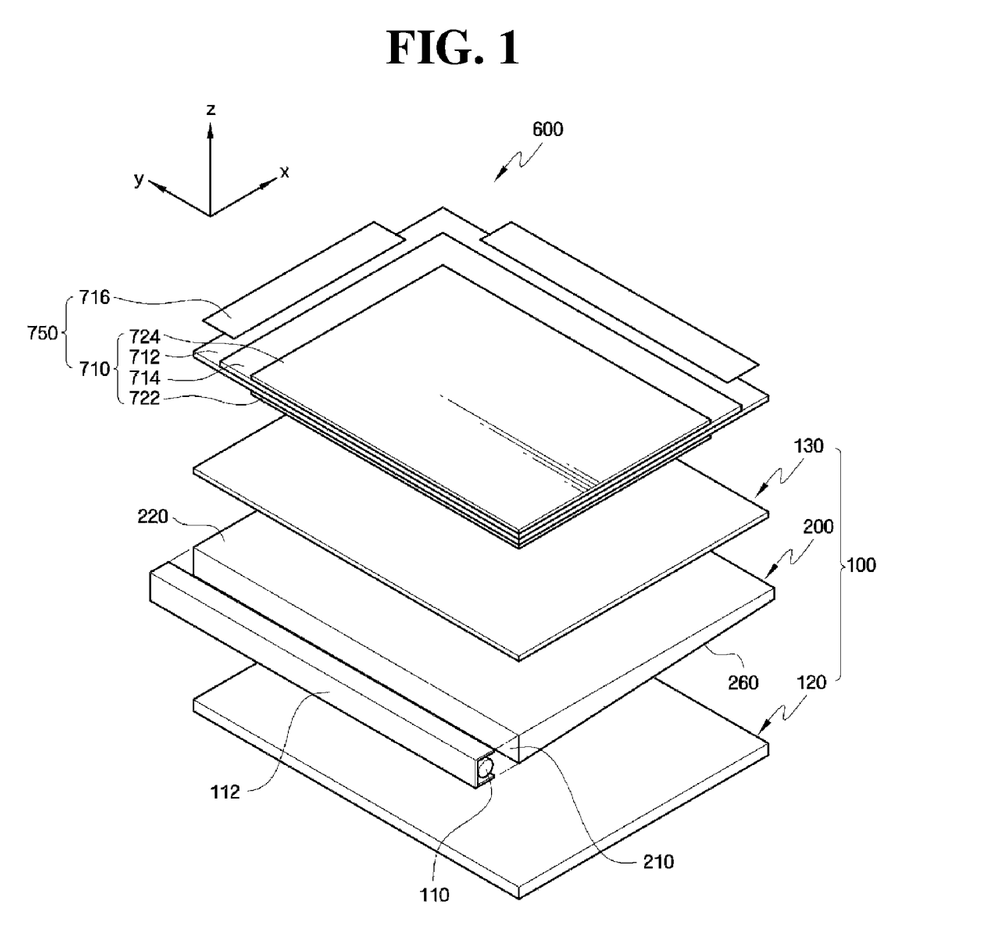
FIG. 1 is an exploded perspective view of an exemplary embodiment of a liquid crystal display ("LCD") according to the present invention.

FIG. 1 is an exploded perspective view of an exemplary embodiment of an LCD according to the present invention.

Referring to FIG. 1, an LCD 600 includes a display unit 750 consisting of an LCD panel 710 for displaying an image and drive circuit unit 716 for driving the LCD panel 710, and a backlight unit 100 providing light to the LCD panel 710.

The LCD panel 710 includes a first substrate 712, a second substrate 714 opposing the first substrate 714, a liquid crystal molecular layer (not shown) sandwiched between the first and second substrates 712 and 714, and polarizing plates 722 and 724 disposed on at least one surface of the LCD panel 710.

In one exemplary embodiment, the first substrate 712 may be a thin-film transistor ("TFT") substrate having a matrix of TFTs (not shown) as switching elements. Each of the TFTs has a source terminal connected to a corresponding one of a plurality of data lines (not shown), a gate terminal connected to a corresponding one of a plurality of gate lines (not shown), and a drain terminal connected to a corresponding one of a plurality of pixel electrodes.

In one exemplary embodiment, the second substrate 714 may be a color filter substrate having RGB pixels for displaying colors (not shown). In one exemplary embodiment the color filters may be formed by a thin film process. Common electrodes (not shown), exemplary embodiments of which may be made of a transparent conductive material, are formed on the second substrate 714.

The liquid crystal molecular layer is disposed between the first and second substrates 712 and 714 and has liquid crystal molecules aligned with the electric field created between the first and second substrates 712 and 714. In particular, in one exemplary embodiment, the liquid crystal molecular layer may be a twisted nematic liquid crystal molecular layer. If an electric field is not created between the first and second substrates 712 and 714, the longitudinal axes of molecules in the twisted nematic liquid crystal molecular layer are aligned substantially parallel to the surfaces of the first and second substrates 712 and 714 and twisted spirally by about 90° from the first substrate 712 to the second substrate 714. If a sufficient electric field is formed between the first and second substrates 712 and 714, the longitudinal axes of liquid crystal molecules are oriented parallel to the direction of the electric field and perpendicular to the first and second substrates 712 and 714.

The polarizing plates 722 and 724 include a first polarizing plate 722 disposed on a bottom surface of the LCD panel 710 and a second polarizing plate 724 disposed on a top surface of the LCD panel 710.

The first polarizing plate 722 is disposed below the first substrate 712 and has a first polarizing axis. Light passing through the first polarizing plate 722 is polarized in the direction of the first polarizing axis and is incident on the liquid crystal molecular layer. The second polarizing plate 724 is disposed above the second polarizing plate 724 and has a second polarizing axis. Light that has passed through the liquid crystal molecular layer can pass through or be blocked by the second polarizing plate 724 depending on whether the direction of its polarization coincides with the direction of the second polarizing axis.

The first and second polarizing axes intersect each other at an angle between 0° and 90°. For example, in a normally white mode, the first and second polarizing axes intersect each other at right angles, e.g., they are substantially orthogonal to one another. In a normally black mode, the first polarizing axis is substantially parallel to the second polarizing axis. The first and second polarizing axes and the relationship between the alignment direction of liquid crystal molecules and the first and second polarizing axes will be described in detail later.

In the LCD panel 710 having the aforementioned configuration, power may be applied to a gate terminal of a TFT so that the TFT is turned on to generate an electric field between a pixel electrode and a common electrode. The electric field varies the arrangement (orientations) of liquid crystal molecules interposed between the first and second substrates 712 and 714. The transmittance of the light supplied from the backlight unit 100 varies depending upon the variation of the orientations of liquid crystal molecules.

The drive circuit unit 716 includes a gate driver (not shown) generating a plurality of gate signals and supplying each gate signal to a corresponding one of the plurality of gate lines, a data driver (not shown) generating image data voltages and supplying each data voltage to a corresponding one of the plurality of data lines.

In one exemplary embodiment, the gate driver and the data driver are integrated circuits, and may be connected to the LCD panel 710 in the form of a tape carrier package ("TCP"), a chip on film ("COF"), and other similar configurations. Alternative exemplary embodiments include configurations wherein, the gate driver and data driver integrated circuits may be directly mounted on the LCD panel 710.

The backlight unit 100 includes a light source 110, a light source cover 112 protecting the light source 110, a light guide plate ("LGP") 200 guiding the path of light emitted by the light source 110, a reflector sheet 120 disposed below the light source 110, and at least one optical sheet 130 disposed above the LGP 200.

The light source 110 is disposed at one side surface of the light source 110. The light source 110 generates light responsive to externally applied driving power. In one exemplary embodiment, the light source 110 may be a cold cathode fluorescent lamp ("CCFL") that has a long cylindrical shape. Alternative exemplary embodiments also include configurations wherein, the light source 110 may be an external electrode fluorescent lamp ("EEFL") that has an external electrode formed at each end portion. Alternative light sources may be used as would be apparent to one of ordinary skill in the art.

The light source cover 112 surrounds three sides of the light source 110 and covers the light source 110. The light source cover 112 protects the light source 110 and reflects the light generated from the light source 110 toward the LGP 200, thereby improving the light utilization efficiency.

The LGP 200 guides the traveling path of light incident from the light source 110. In order to prevent light loss, in one exemplary embodiment the LGP 200 is made of a transparent material such as polymethyl methacrylate ("PMMA").

Figure 2:
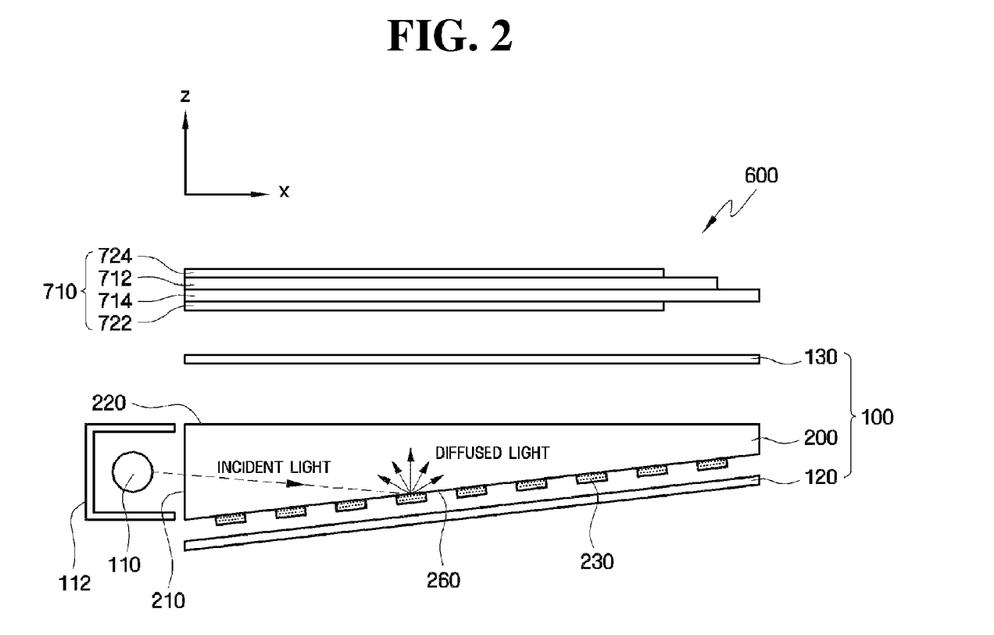
FIG. 2 is a cross-sectional view illustrating an exemplary embodiment of an LCD panel and a backlight unit in the exemplary embodiment of an LCD of FIG. 1.

The LGP 200 has an incident surface 210 into which the light emitted from the light source 110 is incident, a top surface 220 which contacts the incident surface 210, and a bottom surface 260 which contacts the incident surface 210 and opposes the top surface 220. In one exemplary embodiment, the LGP 200 may have a wedge shape (as shown in FIG. 2) tapering in thickness away from the incident surface 210. This configuration allows light emitted by the light source 110 disposed at one side of the LGP 200 to easily reach a portion of a bottom surface of the LGP 200 that is farthest from the light source 110. Alternative exemplary embodiments include configurations wherein, the LGP 200 may have a uniform thickness between the top and bottom surfaces. In such an alternative exemplary embodiment, the light source 110 may be disposed at either side of the LGP 200.

The LGP 200 may have reflective patterns (not shown) formed on one surface thereof, which reflect light incident on the LGP 200 toward the LCD panel 710, as will be described in more detail later.

The reflector sheet 120 is disposed under the LGP 200. The reflector sheet 120 reflects the light leaked from the LGP 200 back to the LGP 200. The reflector sheet 120 is made of a highly reflective material, exemplary embodiments of which include white polyethylene terephthalate ("PET") or white polycarbonate ("PC"), or other materials having similar characteristics.

In order to enhance the brightness of light emitted from the LGP 200 or improve display quality, the optical sheet 130 is disposed above the LGP 200, as will be described later.

Figure 3:
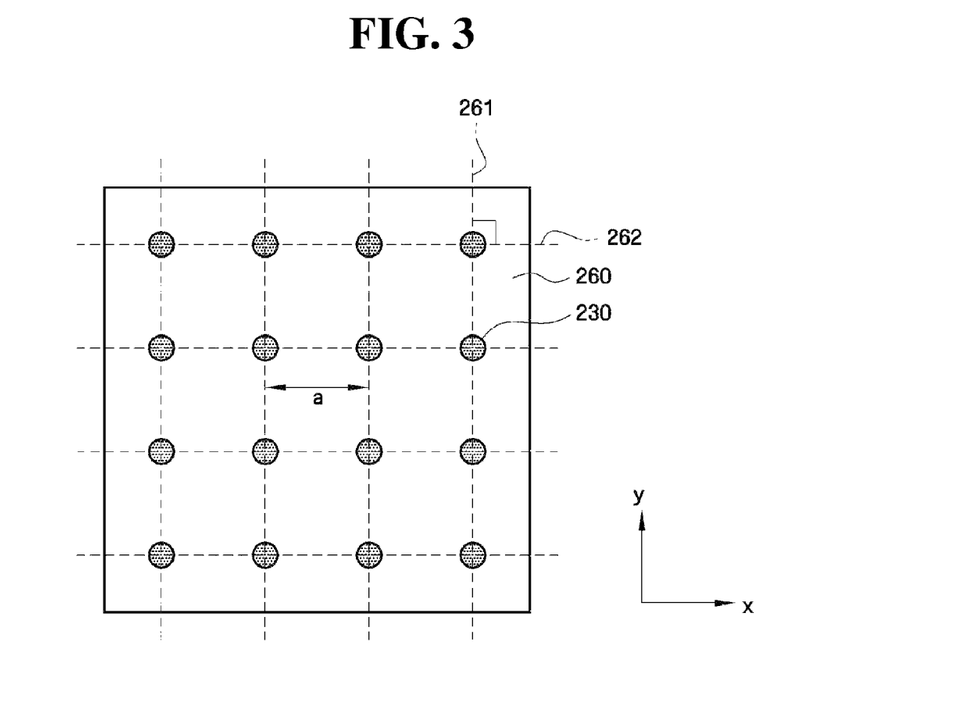
FIG. 3 illustrates an exemplary embodiment of a reflective pattern formed on a bottom surface of the exemplary embodiment of a light guide plate (LGP) shown in FIG. 2.

FIG. 2 is a cross-sectional view illustrating an exemplary embodiment of an LCD panel and a backlight unit in the exemplary embodiment of an LCD of FIG. 1, and FIG. 3 illustrates an exemplary embodiment of a reflective pattern formed on a bottom surface of the exemplary embodiment of a light guide plate ("LGP") shown in FIG. 2.

Referring to FIGS. 2 and 3, the LGP 200 in the LCD 600 has a plurality of dot patterns 230 on the bottom surface 260 thereof. As shown in FIG. 3, the dot patterns 230 are equally spaced apart from each other by a distance 'a'. The dot patterns 230 are positioned at points where a plurality of first straight lines 261 extending in a first (y) direction intersect a plurality of second straight lines 262 extending in a second (x) direction, substantially orthogonal to the first straight lines 261. The first direction refers to a direction in which a plurality of prism patterns are arranged on a surface layer (150 in FIG. 4) of a composite polarizing sheet (155 in FIG. 4) as will be discussed in more detail below.

The dot pattern 230 acts as a reflective pattern. Light emitted from the light source 110 propagates along top and bottom surfaces 220 and 260 of the LGP 200 until it reaches the dot patterns 230. Light is diffusively reflected toward the LCD panel 710 as it passes through the dot patterns 230. The diffused light is diffused and/or condensed as it passes through the at least one optical sheet 130 and provided to the LCD panel 710. Light incident into a space between the adjacent dot patterns 230 may escape out though the bottom surface 260 of the LGP 200. The reflector sheet 120 reflects the escaping light back into the LGP 200.

Figure 4:
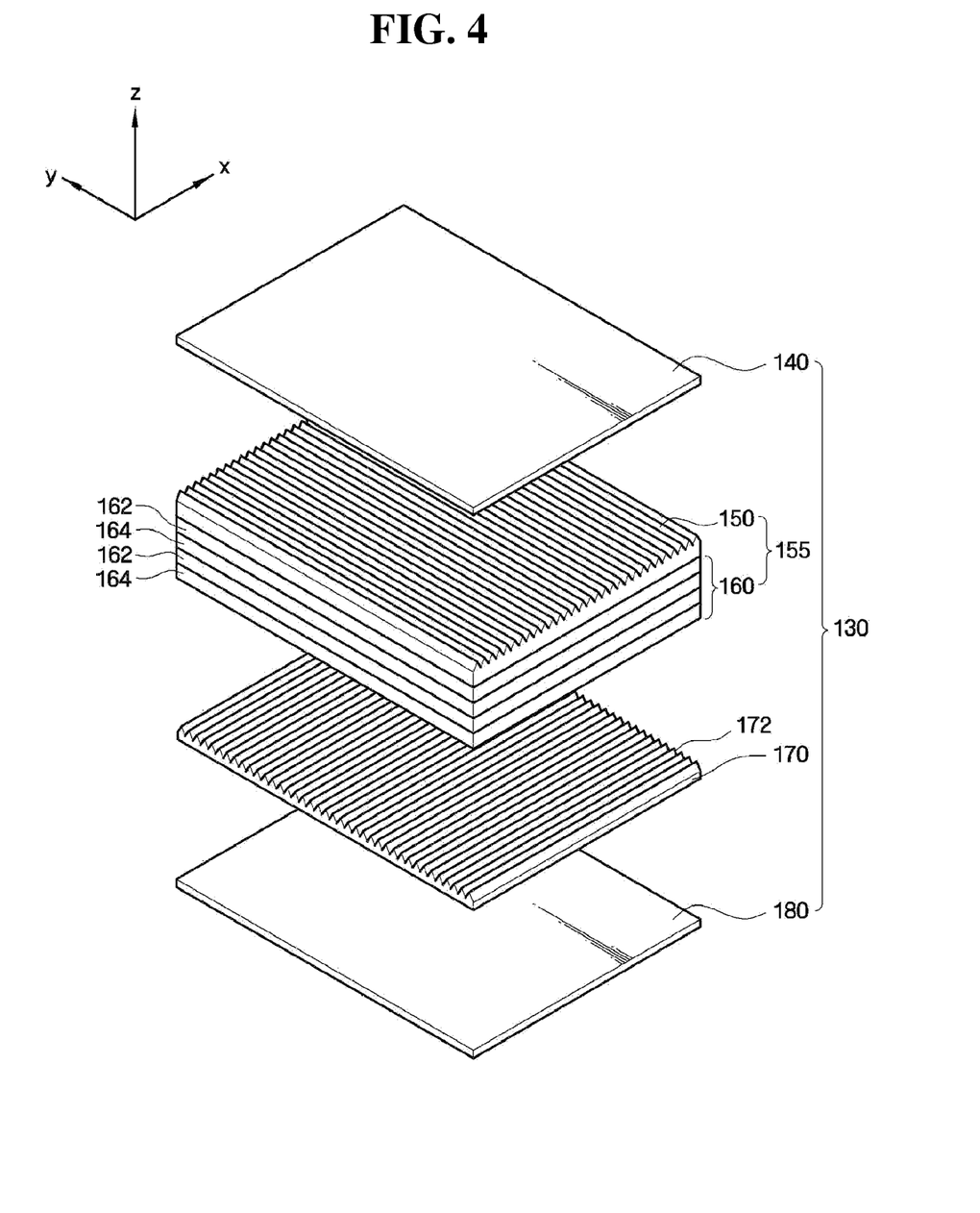
FIG. 4 is an exploded perspective view illustrating an exemplary embodiment of optical sheets in the exemplary embodiment of an LCD of FIG. 1.

FIG. 4 is an exploded perspective view illustrating an exemplary embodiment of optical sheets in the exemplary embodiment of an LCD of FIG. 1.

Referring to FIG. 4, the at least one optical sheet 130 includes a diffusion sheet 180, a prism sheet 170, a composite polarizing sheet 155, and a protective sheet 140. More specifically, the diffusion sheet 180 has a haze value of about 50% to 70%, which is large enough to reduce occurrence of bright lines, dark lines, and dark corners, thereby improving display quality. The prism sheet 170 has a plurality of prism patterns 172 connected in parallel to each other on a top surface thereof. Each of the prism patterns 172 has a stripe shape that extends in a direction (x direction) parallel to the direction in which light is incident.

The prism pattern 172 has a substantially triangular-shaped cross-section when viewed along a direction perpendicular to its longitudinal direction. The prism pattern 172 has a vertex angle ranging from about 80° to about 150°. In one exemplary embodiment, a top edge of the prism pattern 172 where two opposing oblique faces thereof meet may be bent or in an alternative exemplary embodiment, it may be curved.

The composite polarizing sheet 155 includes a surface layer 150 having a plurality of prism patterns that extend in the first direction (in the present exemplary embodiment, the y-direction) and are arranged substantially parallel to each other and a reflective polarizing layer 160 having a transmission axis extending in a direction other than the first direction.

The surface layer 150 allows light passing therethrough to be oriented in a direction normal to the surface layer 150. The first (y) direction, in which the plurality of prism patterns are arranged in parallel, may be substantially perpendicular to the direction in which light is incident from the light source 110. That is, the direction (y direction) in which the plurality of prism patterns are arranged on the surface layer 150 of the composite polarizing sheet 155 may be substantially orthogonal to the direction (x direction) in which the plurality of prism patterns 172 are arranged on the prism sheet 170 as described above.

The reflective polarizing layer 160 transmits light having first polarization oriented in a second direction while reflecting light having second polarization oriented in a direction other than the second direction. The second direction may be substantially parallel to or substantially perpendicular to a polarizing axis of a first polarizing plate (722 in FIGS. 1 and 5) and/or a polarizing axis of a second polarizing plate (724 in FIGS. 1 and 5). Alternatively, the second direction may coincide with the direction in which liquid crystal molecules in a liquid crystal molecular layer (770 in FIG. 5) in proximity to the composite polarizing sheet 155 are aligned, which will be described in more detail later.

The reflective polarizing layer 160 includes a first layer 162 containing a birefringent material and a second layer 164 that is adjacent to the first layer 162 and is composed of at least one material having a different refractive index from the first layer 162.

More specifically, in one exemplary embodiment, the reflective polarizing layer 160 may consist of an alternating stack of first and second layers 162 and 164 formed of different materials. The reflective polarizing layer 160 may be formed so as to stretch the alternate stack of the first and second layers 162 and 164 along one axis (i.e., x direction). In this case, the alternate stack is not stretched along the y direction normal to the x direction. The material of the first layer 162 exhibits birefringence, which means a refractive index along the x direction (stretching direction) is different from a refractive index along the y direction orthogonal to the x direction. A refractive index of the material of the second layer 164 may be substantially unaffected by stretching.

Thus, it is possible to make a large difference in refractive indices along the x direction between the first and second layers 162 and 164 while maintaining little difference in a refractive index along the y direction therebetween. The y direction is defined as a transmission axis of the reflective polarizing layer 160. Thus, light having first polarization oriented in the y direction is transmitted through the reflective polarizing layer 160. On the other hand, light having second polarization oriented in a direction other than the y direction is not transmitted but is instead reflected by the reflective polarizing layer 160.

In one exemplary embodiment, the first layer 162 may be formed of crystalline naphthalene dicarboxylic acid polyester such as polyethylene naphthalate ("PEN"). In one exemplary embodiment, the second layer 164 may be formed of a copolyester of naphthalene dicarboxylic acid and terephthalic or isothalic acid ("coPEN").

The protective sheet 140 is disposed on the composite polarizing sheet 155 and protects the composite polarizing sheet 155 against damage such as abrasions and scuffing. The protective sheet 140 also prevents the composite polarizing sheet 155 from contacting the overlying LCD panel 710, thereby improving reliability in display quality. In one exemplary embodiment, the protective sheet 140 may have a haze value of about 70 to 90%.

Figure 5:
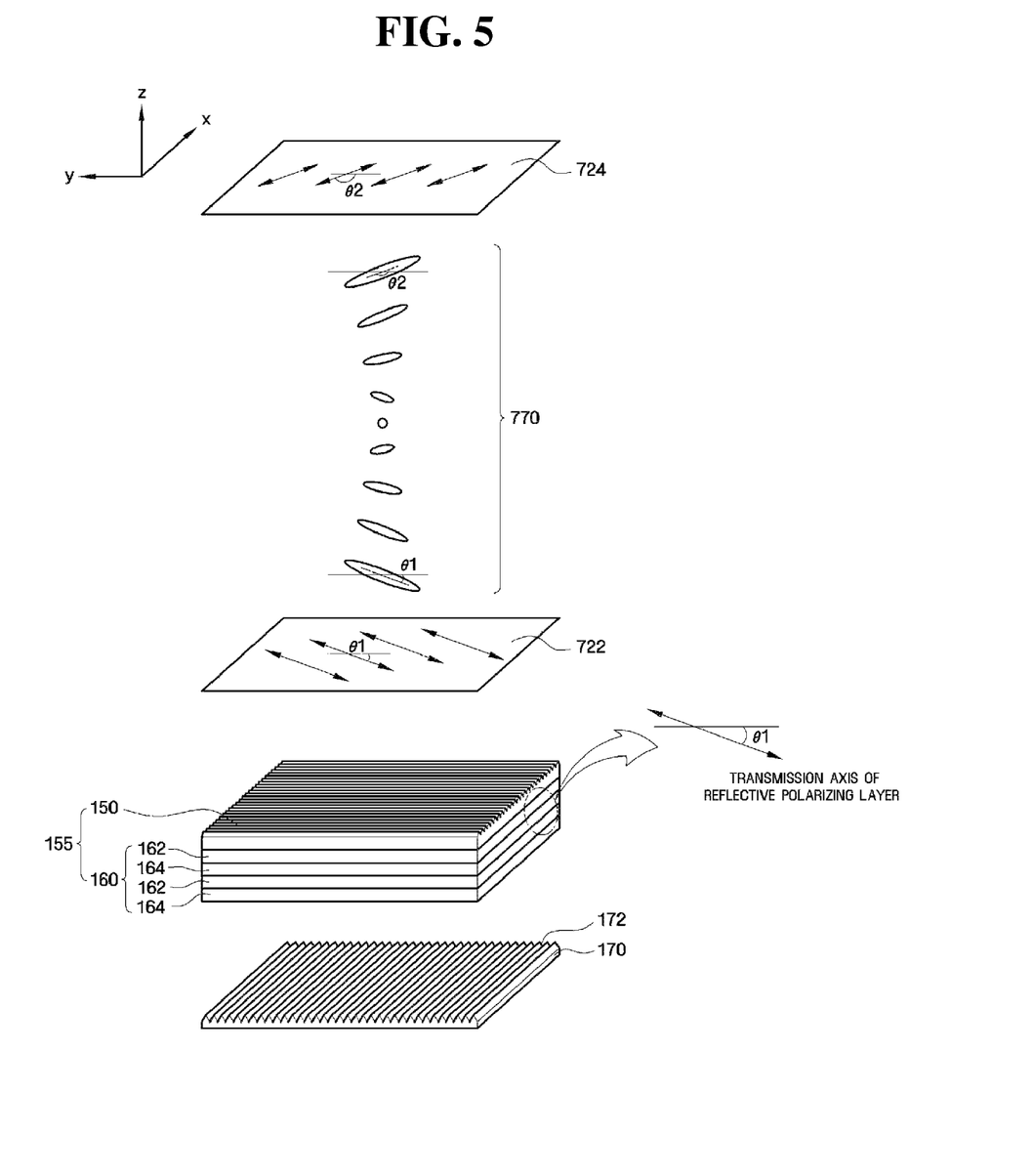
FIG. 5 is a conceptual diagram illustrating the relationship among a prism sheet, a composite polarizing sheet, and first and second polarizing plates illustrated in FIG. 4.
Figure 6:
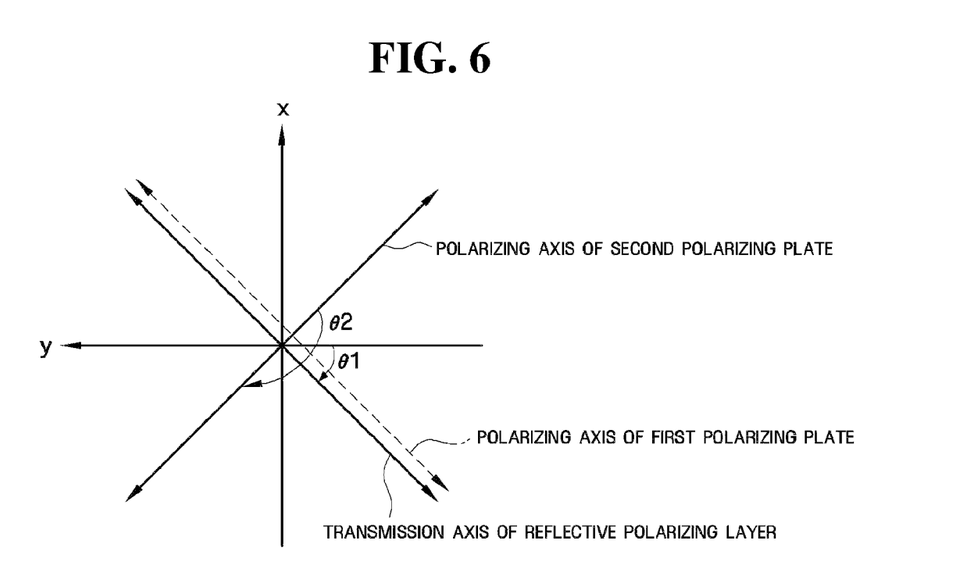
FIG. 6 illustrates the relationship among a transmission axis of a reflective polarizing layer and first and second polarizing axes illustrated in FIG. 5.

FIG. 5 is a conceptual diagram illustrating the relationship among a prism sheet 170, a composite polarizing sheet 155, and first and second polarizing plates 722 and 724, respectively, illustrated in FIG. 4, and FIG. 6 illustrates the relationship among a transmission axis of a reflective polarizing layer and first and second polarizing axes illustrated in FIG. 5.

Referring to FIGS. 5 and 6, the prism patterns 172 are formed on the prism sheet 170 substantially parallel to the direction (x direction) that light is incident from the light source 110. The prism patterns are arranged on the surface layer 150 in the composite polarizing sheet 155 in a direction (y direction) substantially perpendicular to the incident light. That is, the direction that the prism patterns 172 are arranged on the prism sheet 170 is substantially orthogonal to the direction that the prism patterns are arranged on the surface layer 150.

This arrangement allows the prism patterns 172 on the prism sheet 170 and the prism patterns on the surface layer 150 to effectively condense light in horizontal and vertical directions.

The transmission axis of the reflective polarizing layer 160 is tilted by a first angle θ1 clockwise relative to the direction (y direction) perpendicular to the direction of the incident light. Thus, the transmission axis of the reflective polarizing layer 160 may be tilted by the first angle θ1 clockwise from the prism patterns formed on the surface layer 150 in the composite polarizing sheet 155.

Due to the tilt of the transmission axis of the reflective polarizing layer 160, the composite polarizing sheet 155 transmits a portion of the incident light having a polarization direction which is tilted by the first angle θ1 clockwise from the y direction perpendicular to the incident light.

The polarizing axis of the first polarizing plate 722 may be tilted by the first angle θ1 clockwise relative to the y direction perpendicular to the direction that light is incident. That is, the polarizing axis of the first polarizing plate 722 coincides with the transmission axis of the reflective polarizing layer 160. This configuration allows light that has passed through the composite polarizing sheet 155 to efficiently propagate through the first polarizing plate 722 to the liquid crystal molecular layer 770.

More specifically, the first polarizing plate 722, which has an inherent light absorption ability, absorbs light polarized in a direction other than that of a polarizing axis of the first polarizing plate 722. Thus, the first polarizing plate 722 may absorb light having a second polarization that is not tilted by the first angle θ1 clockwise from the incident light. Since the composite polarizing sheet 155 reflects light having the second polarization while transmitting light having the first polarization, the light transmitted through the composite polarizing sheet 155 can also pass through the first polarizing plate 722. However, the light having the second polarization is reflected by the composite polarizing sheet 155, wherein it passes back through the prism sheet 170, diffusion sheet 180, etc., until its polarization is switched to the first polarization as will be discussed in more detail below.

Thus, the light transmitted through the composite polarizing sheet 155 can efficiently propagate through the first polarizing plate 722 to the liquid crystal molecular layer 770. The LCD 600 having the above-mentioned configuration allows light irradiated by the backlight unit 100 to efficiently propagate to the LCD panel 710, thereby providing improved brightness. The LCD 600 can also attain a high level of brightness using a small number of optical sheets 130, thereby providing manufacturing cost savings. For example, even in an exemplary embodiment which omits the diffusion sheet 180 and/or protective sheet 140 illustrated in FIG. 4, the LCD 600 can provide a high brightness and uniform distribution of light.

The relationship between the alignment direction of the liquid crystal molecules in the liquid crystal molecular layer 770 and the first and second transmission axes of the first and second polarizing plates 722 and 724 will now be described in detail.

Liquid crystal molecules in the liquid crystal molecular layer 770 have a twisted spiral structure between the first and second polarizing plates 722 and 724. As shown in FIG. 5, liquid crystal molecules close to the first polarizing plate 722 are tilted the first angle θ1 clockwise from the y direction. Liquid crystal molecules are further tilted clockwise towards the second polarizing plate 724 so that liquid crystal molecules close to the second polarizing plate 724 are tilted by a second angle θ2 clockwise from the y direction. In the exemplary embodiment wherein the liquid crystal molecular layer 770 is a twisted nematic liquid crystal molecular layer having positive dielectric anisotropy, the second angle θ2 will equal the first angle θ1 plus 90°.

The light is polarized in the direction of the first polarizing axis as it passes through the first polarizing plate 722 and is incident on the liquid crystal molecular layer. The incident light may be polarized in a different direction due to retardation caused by refractive index anisotropy of liquid crystal molecules as it passes through the liquid crystal molecular layer.

More specifically, if an electric field is not applied between the first and second substrates 712 and 714, the longitudinal axes of liquid crystal molecules are twisted spirally by 90° from the first substrate 712 to the second substrate 714. Therefore, the light that has passed through the first polarizing plate 722 has a polarization direction that is rotated by 90° as it passes through the liquid crystal molecular layer.

If the transmission axis of the first polarizing plate 722 is perpendicular to the transmission axis of the second polarizing plate 724, e.g., the second angle θ2 is equal to the first angle θ1 plus 90°, light that has passed through the liquid crystal molecular layer passes through the second polarizing plate 724 to realize a bright state. In this case, the LCD 600 may be said to operate in a normally white mode. Conversely, if the transmission axes of the first and second polarizing plates 722 and 724 are parallel to each other, e.g., the second angle θ2 is equal to the first angle θ1 or the first angle θ1 plus 180°, light that has passed through the liquid crystal molecular layer is blocked by the second polarizing plate 724 to realize a dark state. In this case, the LCD 600 may be said to operate in a normally black mode.

If a sufficient electric field is created between the first and second substrates 712 and 714, the longitudinal axes of liquid crystal molecules are perpendicular to the first and second substrates 712 and 714. Thus, light that has passed through the first polarizing plate 722 has polarization that remains unchanged as it passes through the liquid crystal molecular layer. In a normally white mode of operation, light that has passed through the liquid crystal molecular layer is blocked by the second polarizing plate 724 to produce a black image. In a normally black mode, light that has passed through the liquid crystal molecular layer passes through the second polarizing plate 724 to produce a white image.

Figure 7:
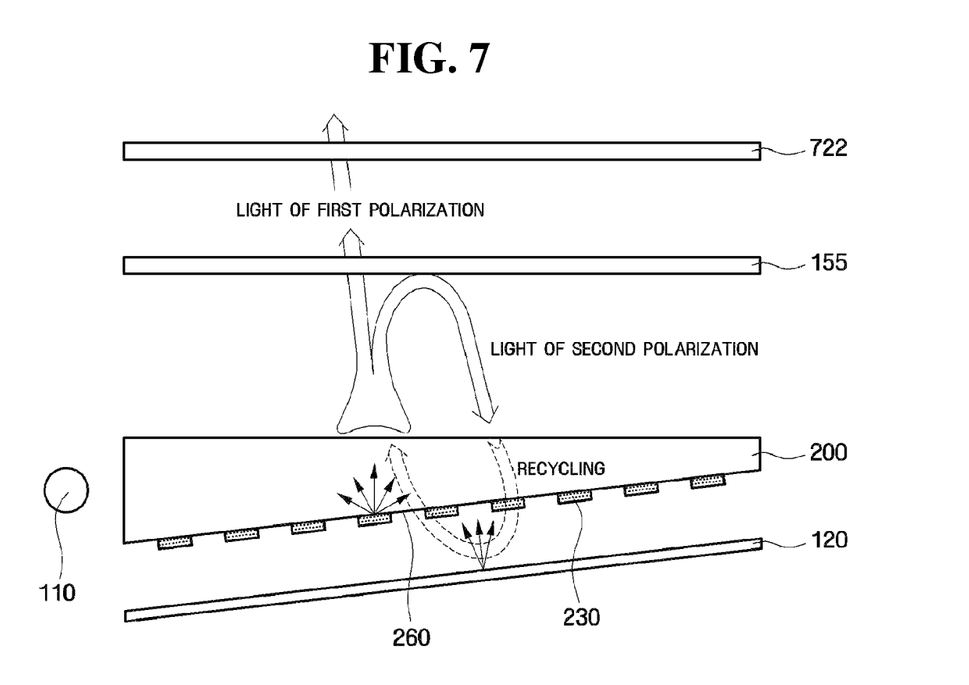
FIG. 7 is a conceptual diagram illustrating the process of providing light emitted by a light source to an exemplary embodiment of an LCD panel in the exemplary embodiment of an LCD of FIG. 1.

FIG. 7 is a conceptual diagram illustrating the process of providing light emitted by the light source 100 to the exemplary embodiment of an LCD panel 710 in the LCD 600 of FIG. 1.

Light emitted from the light source 110 propagates through the LGP 200 to the composite polarizing sheet 155, the composite polarizing sheet 155 transmits light having the first polarization while reflecting light having the second polarization oriented in a direction other than that of the light having the first polarization. As discussed above, the light having the first polarization transmitted through the composite polarizing sheet 155 can effectively passes through the first polarizing plate 722. On the other hand, the light having the second polarization may be polarized in a different direction after it passes back through the LGP 200 and/or the reflector sheet 120. This reflection of light that would otherwise have been absorbed at the first polarizing plate 722 is referred to hereinafter as recycling. The recycling process is repeated until the light of the second polarization is transformed into the light of the first polarization.

As described above, the LCD 600 having the above-mentioned configuration allows light irradiated by the backlight unit 100 to efficiently propagate to the LCD panel 710 using a recycling process, thereby providing improved brightness and display quality. The LCD 600 can also attain a high level of brightness using a smaller number of optical sheets 130 than a conventional LCD, thereby providing manufacturing cost savings.

Another exemplary embodiment of a composite polarizing sheet and LCD 600 including the same according to the present invention will now be described in detail with reference to FIGS. 1, 2 and 4 through 10B. For brevity, components each having the same function as described in the first exemplary embodiment are respectively identified by the same reference numerals, and their repetitive description will be omitted.

Figure 8:
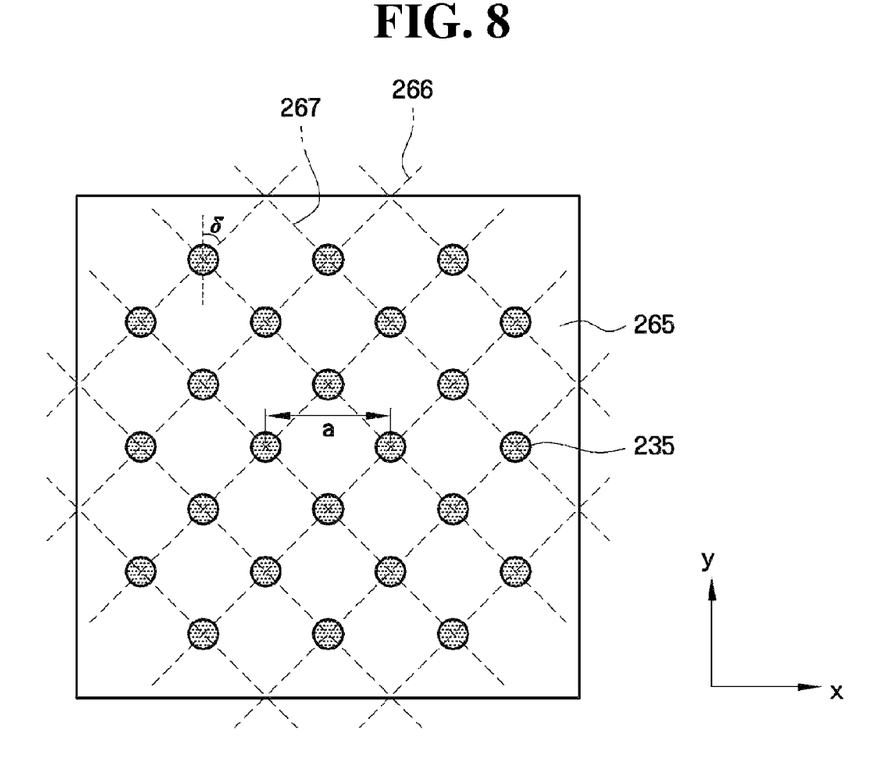
FIG. 8 illustrates exemplary embodiments of reflective patterns formed on a bottom surface of an exemplary embodiment of an LGP in an exemplary embodiment of an LCD according to the present invention.

FIG. 8 illustrates exemplary embodiments of reflective patterns formed on a bottom surface of an exemplary embodiment of an LGP in an exemplary embodiment of an LCD according to the present invention.

Referring to FIG. 8, an LGP 200 in the LCD 600 has a plurality of dot patterns 235 on a bottom surface 265 thereof. As shown in FIG. 8, the dot patterns 235 are equally spaced apart from each other by a distance 'a'. The dot patterns 235 are positioned at points where a plurality of first oblique lines 266 having an angle δ, other than a right angle, relative to the first (y) direction intersect a plurality of second oblique lines 267. As described above, the first direction refers to the direction in which the plurality of prism patterns are arranged on the surface layer 150 of the composite polarizing sheet 155. That is, the dot patterns 235 may be arranged in a zigzag fashion within the xy plane.

In one exemplary embodiment, the intersection angle δ between the plurality of first oblique lines 266 and the first (y) direction may be 45°. In one exemplary embodiment, the plurality of second oblique lines 267 may be orthogonal to the plurality of first oblique lines 266.

Figure 9:
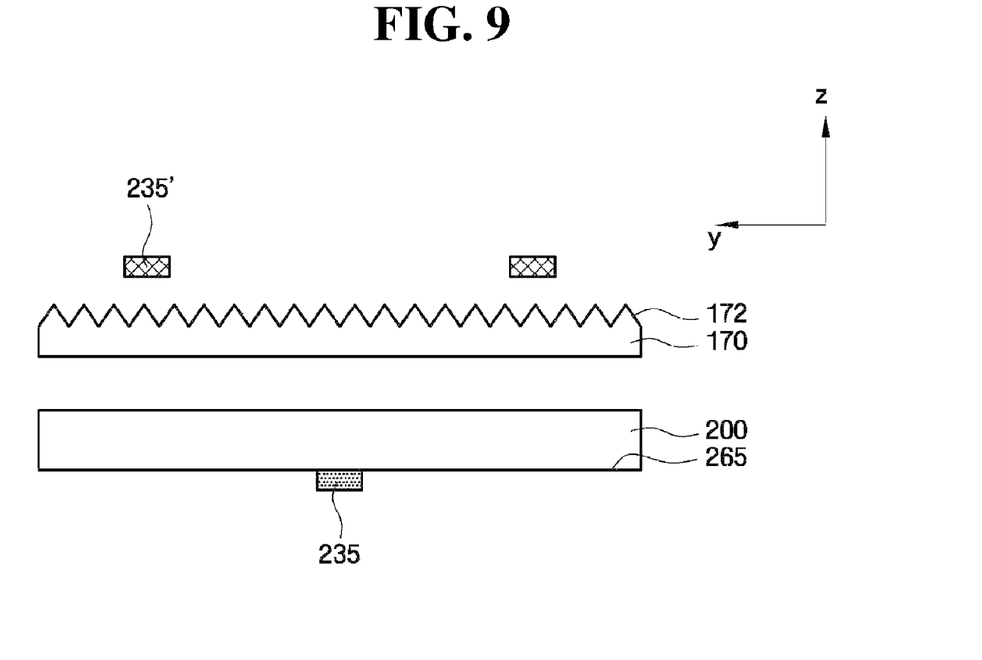
FIG. 9 is a diagram illustrating an exemplary embodiment of a pattern image for one of the reflective patterns shown in FIG. 8.
Figure 10A:
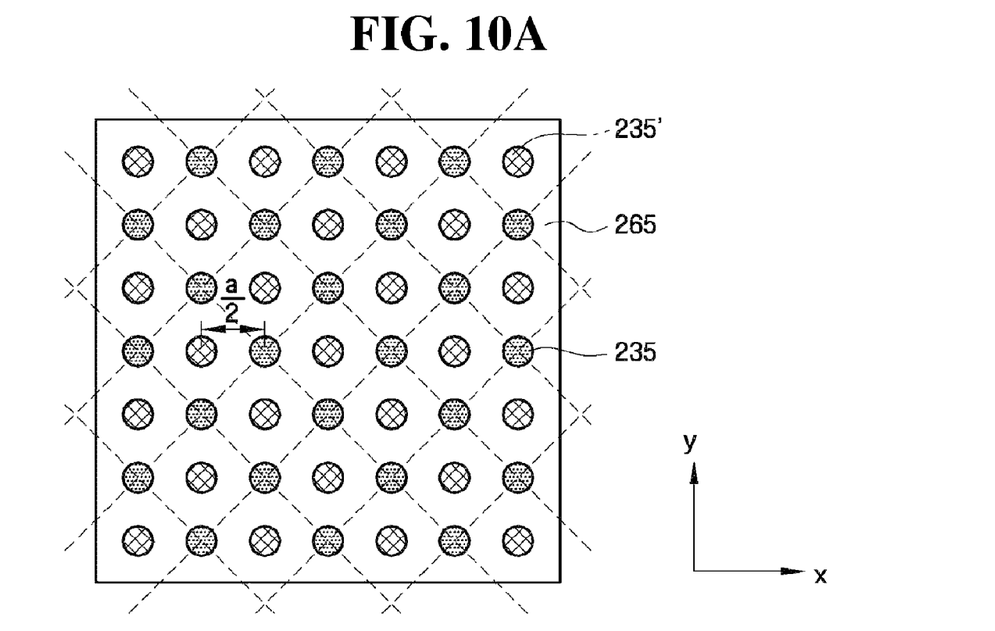
FIG. 10A illustrates pattern images for the reflective patterns shown in FIG. 8.
Figure 10B:
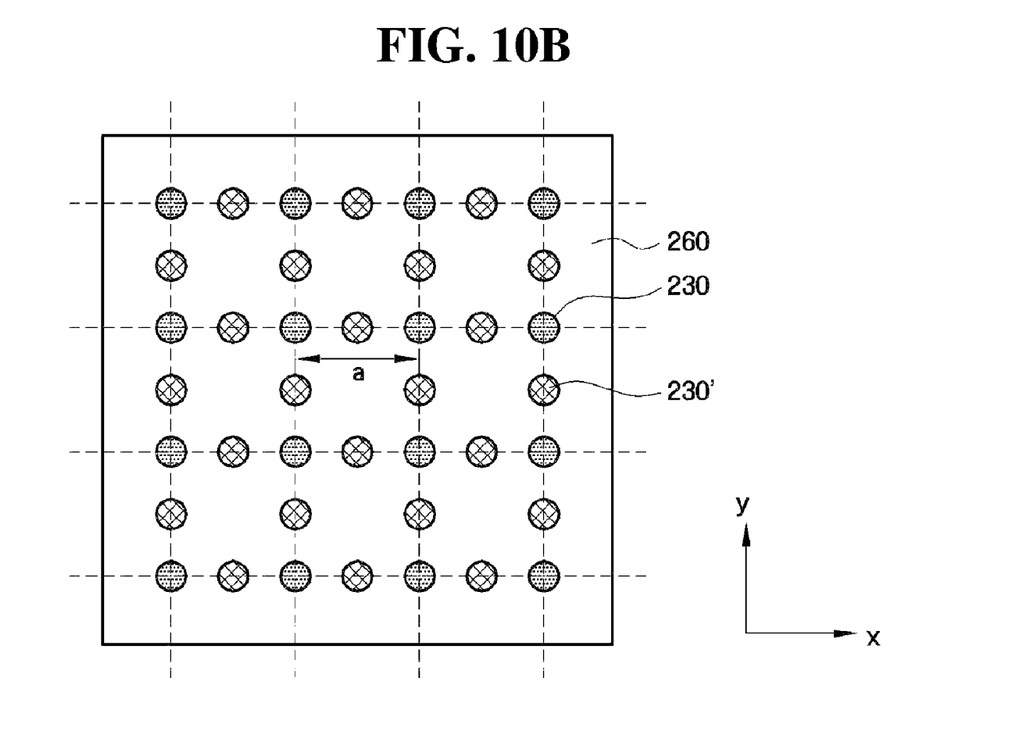
FIG. 10B illustrates pattern images for the reflective patterns shown in FIG. 3.

FIG. 9 is a diagram illustrating an exemplary embodiment of a pattern image for one of the reflective patterns shown in FIG. 8, FIG. 10A illustrates pattern images for the reflective patterns shown in FIG. 8, and FIG. 10B illustrates pattern images for the reflective patterns shown in FIG. 3.

Referring to FIG. 9, two pattern images 235' are visually perceived for each of the dot patterns 235 formed on the bottom surface 265 of the LGP 200 through the prism patterns 172 formed on the prism sheet 170. Although not shown, two pattern images are also similarly perceived for each dot pattern 235 through prism patterns formed on the surface layer 150 of the composite polarizing sheet 155.

Thus, when the prism patterns 172 are arranged on the prism sheet 170 substantially perpendicular to the direction that the prism patterns are arranged on the surface layer as described above, four pattern images can be visually perceived for each dot pattern 235.

More specifically, referring to FIG. 10A, the four pattern images 235' can be visually perceived within the xy plane in all four directions (top, bottom, left, and right) with respect to each dot pattern 235. The distance between the dot pattern 235 and each of its pattern images 235' may be a/2. Similarly, referring to FIG. 10B, in the LCD 600 according to the previous exemplary embodiment, four pattern images 230' can be visually perceived within the xy plane in four directions (top, bottom, left, and right) with respect to each dot pattern 230. The distance between the dot pattern 230 and each of its pattern images 230' may be a/2 or a.

The viewer can perceive the pattern images 230' or 235' with the dot pattern 230 or 235. When the dot pattern 230 or 235 and the pattern images 230' or 235' are more clearly perceived by an observer, the display quality of the LCD 600 may be degraded. Since the distance between the dot pattern 235 and its pattern image 235' in FIG. 10A is less than the distance between the dot pattern 230 and its pattern image 230' in FIG. 10B, the viewer is less able to perceive the pattern images 235'. Thus, the LCD 600 according to the current exemplary embodiment can provide a high display quality.

Similar to the previous exemplary embodiment, the LCD 600 according to the current exemplary embodiment allows light transmitted through the composite polarizing sheet 155 to effectively propagate through the first polarizing plate 722 to the LCD panel 710. The LCD 600 also allows light irradiated by the backlight unit 100 to efficiently propagate to the LCD panel 710 using a recycling process, thereby providing improved brightness and display quality. The LCD 600 can also attain a high level of brightness using a smaller number of optical sheets 130 than a conventional LCD, thereby providing manufacturing cost savings.

Figure 11:
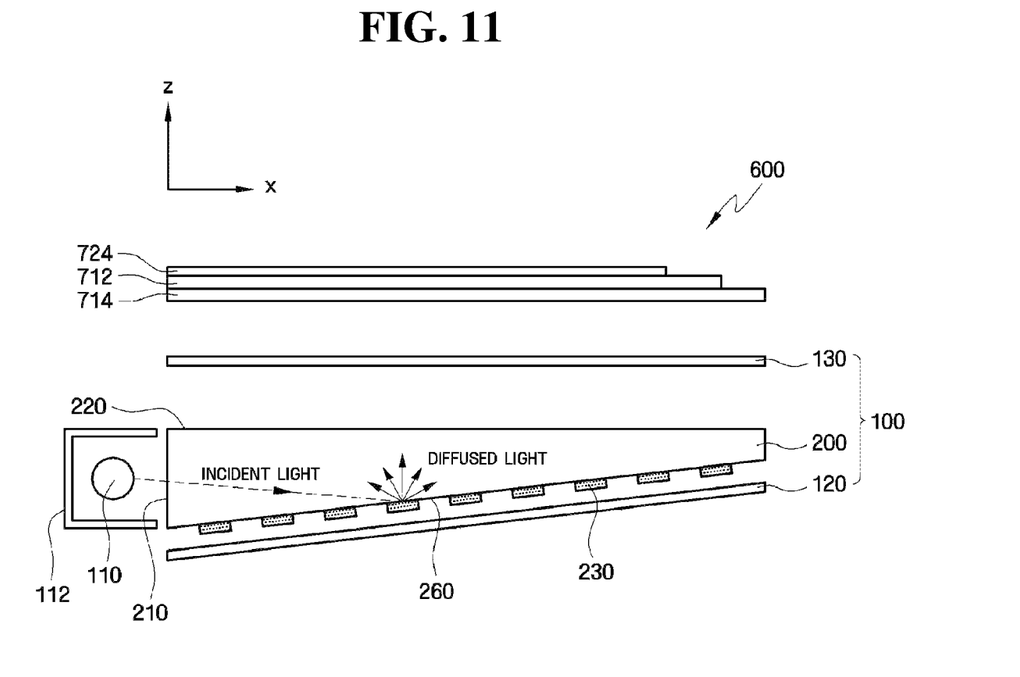
FIG. 11 is a cross-sectional view of an exemplary embodiment of an LCD panel and a backlight unit in another exemplary embodiment of an LCD according to the present invention.
Figure 12:
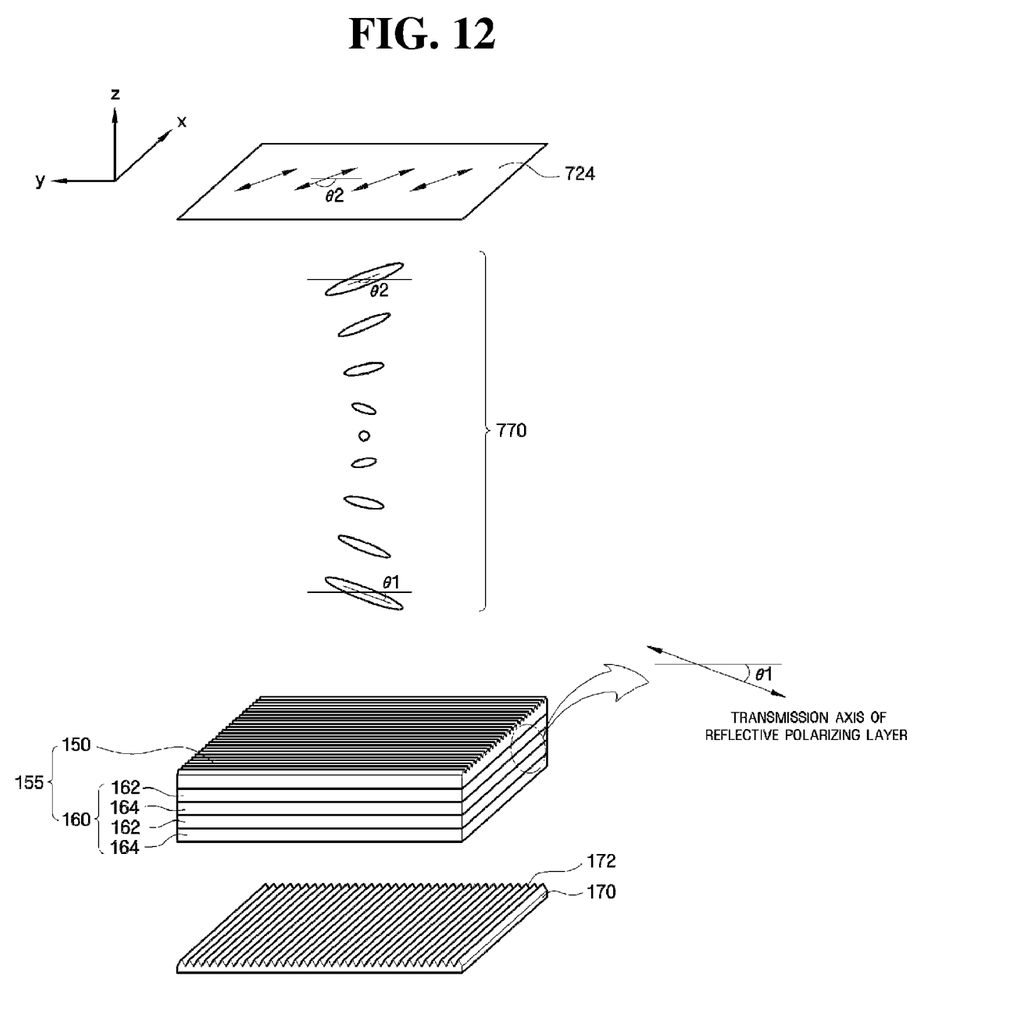
FIG. 12 is a conceptual diagram illustrating the relationship among a prism sheet, a composite polarizing sheet, and a second polarizing plate illustrated in FIG. 11.

A composite polarizing sheet and another exemplary embodiment of an LCD 600 including the same according to the present invention will now be described in detail with reference to FIGS. 1, 11, and 12. FIG. 11 is a cross-sectional view of an exemplary embodiment of an LCD panel and a backlight unit in another exemplary embodiment of an LCD according to the present invention, and FIG. 12 is a conceptual diagram illustrating the relationship among a prism sheet, a composite polarizing sheet, and a second polarizing plate illustrated in FIG. 11. For brevity, components each having the same function as described in the first exemplary embodiment are respectively identified by the same reference numerals, and their repetitive description will be omitted.

Referring to FIG. 11, unlike in the previous embodiments, the present exemplary embodiment of an LCD 600 does not include the first polarizing plate 722 having a first polarizing axis disposed on a bottom surface of the LCD panel 710. The direction (i.e., second direction) of the transmission axis of the reflective polarizing layer 160 is substantially perpendicular to the direction of a second polarizing axis of the second polarizing plate 724. The second direction also coincides with the direction that liquid crystal molecules close to the composite polarizing sheet 155 are aligned. In this case, the reflective polarizing layer 160 in the composite polarizing sheet 155 transmits only light of the first polarization to the liquid crystal molecular layer 770. Essentially, the composite polarizing sheet 155 replaces the function of the first polarizing plate 722 of the previous exemplary embodiments.

Although not shown, similar to the exemplary embodiments illustrated in FIGS. 8, 9, and 10A, dot patterns 230 may be formed at points on the bottom surface 260 of the LGP 200 where a plurality of first oblique lines (not shown) having an angle δ, other than a right angle, relative to the first (y) direction intersect a plurality of second oblique lines (not shown). The detailed description thereof will not be given to avoid redundancy.

A composite polarizing sheet and another exemplary embodiment of an LCD 600 including the same according to the present invention will now be described in detail with reference to FIGS. 1, 13, and 14.

Figure 13:
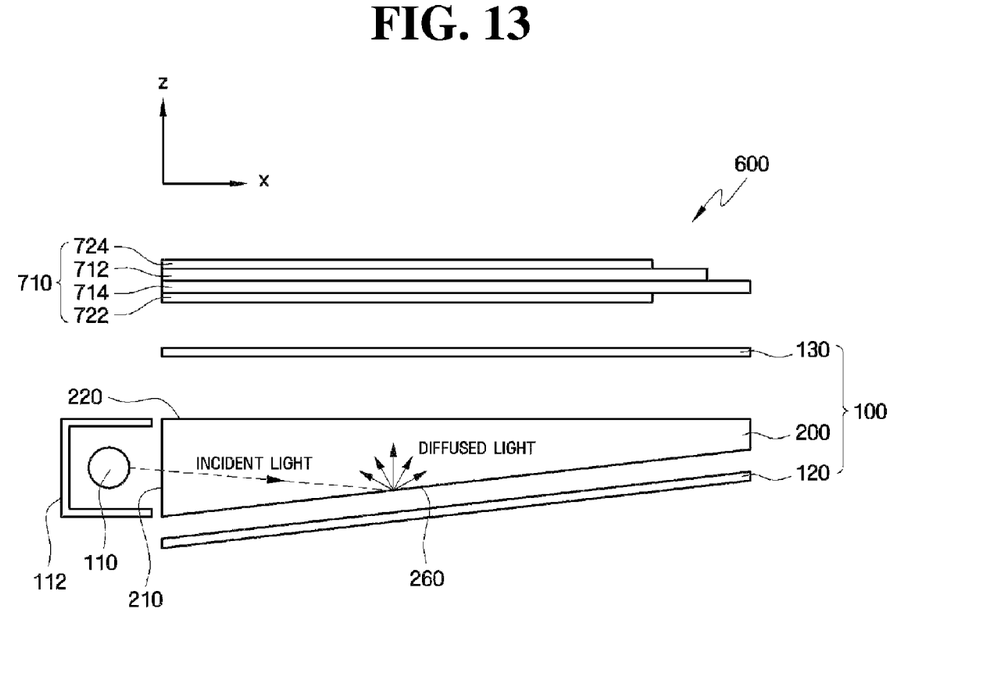
FIG. 13 is a cross-sectional view of another exemplary embodiment of an LCD panel and a backlight unit in another exemplary embodiment of an LCD according to the present invention.
Figure 14:
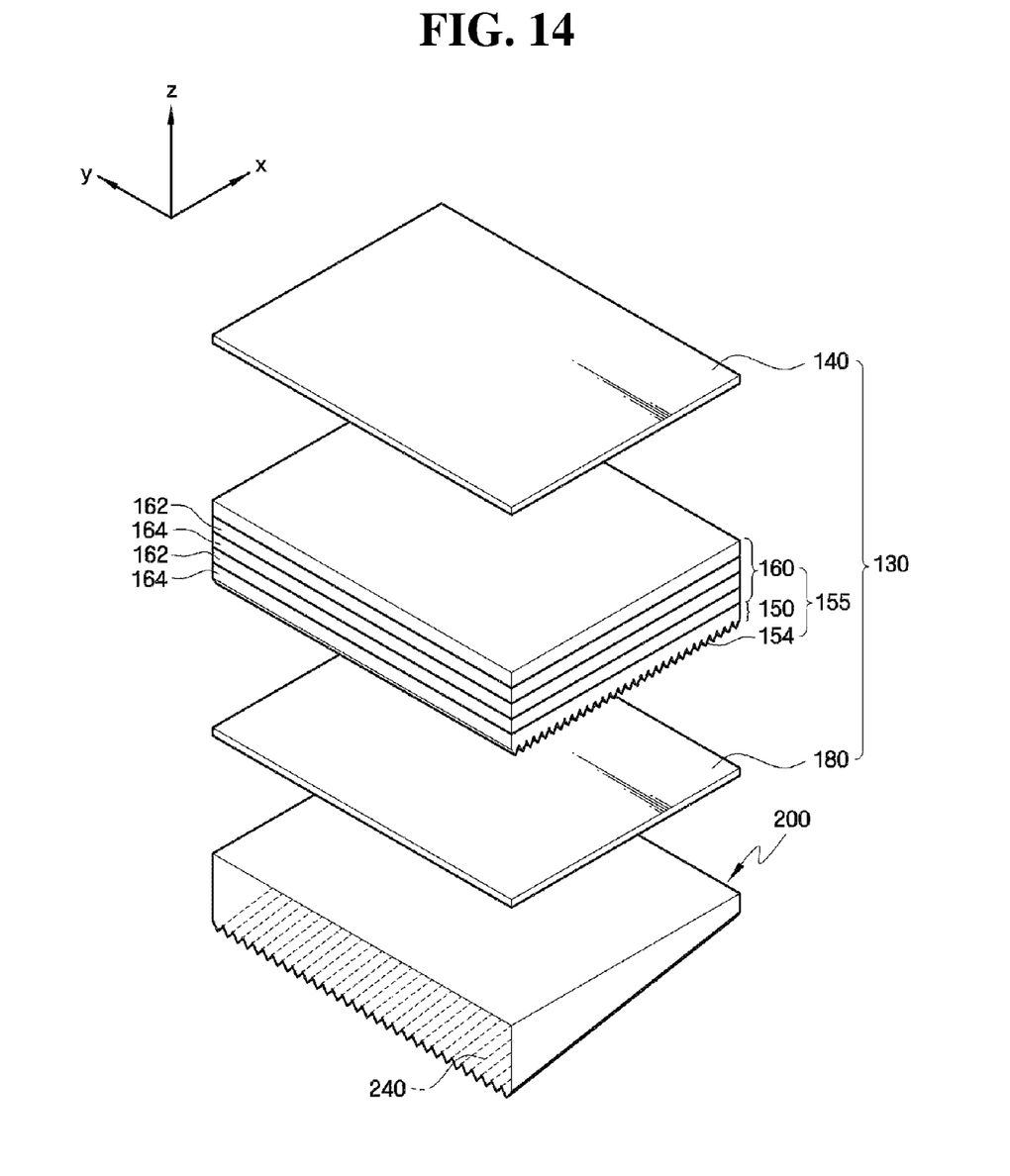
FIG. 14 is a conceptual diagram illustrating the relationship between an LGP and optical sheets illustrated in FIG. 13.

FIG. 13 is a cross-sectional view of another exemplary embodiment of an LCD panel and a backlight unit in another exemplary embodiment of an LCD according to the present invention, and FIG. 14 is a conceptual diagram illustrating the relationship between an LGP and optical sheets illustrated in FIG. 13. For brevity, components each having the same function as described in the first exemplary embodiment are respectively identified by the same reference numerals, and their repetitive description will be omitted.

Referring to FIGS. 13 and 14, the LGP 200 has a plurality of prism patterns 240 formed on a bottom surface 260. The prism patterns 240 act as reflective patterns. The prism patterns 240 may be arranged parallel to each other in a third direction that is substantially parallel to the direction (x direction) in which light is incident. In one exemplary embodiment, the prism pattern 240 has a substantially triangular-shaped cross-section when viewed along a direction perpendicular to its longitudinal direction. In one exemplary embodiment, the prism pattern 240 has a vertex angle ranging from about 80° to about 150°. In one exemplary embodiment, a top edge of the prism pattern 240, where two opposing oblique faces thereof meet, may be bent or curved.

The composite polarizing sheet 155 includes a reflective polarizing layer 160 and a surface layer 150 underlying the reflective polarizing layer 160 and having a plurality of striped inverse prism patterns 154 that extend in the y direction substantially perpendicular to incident light and are arranged parallel to each other. That is, the inverse prism patterns 154 are arranged substantially perpendicular to the direction in which the prism patterns 240 are arranged on the bottom surface 260 of the LGP 200. This arrangement allows the prism patterns 240 on the bottom surface 260 of the LGP 200 and the inverse prism patterns 154 on the surface layer 150 to effectively condense light in both horizontal and vertical directions.

Similar to the first exemplary embodiment as described with reference to FIGS. 1 through 7, the LCD 600 according to the current exemplary embodiment allows light transmitted through the composite polarizing sheet 155 to effectively propagate through the first polarizing plate 722 to the LCD panel 710. The LCD 600 also allows light irradiated by the backlight unit 100 to efficiently propagate to the LCD panel 710 using a recycling process, thereby providing improved brightness and display quality. The LCD 600 can also attain a high level of brightness using a smaller number of optical sheets 130 than a conventional LCD, thereby providing manufacturing cost savings.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A liquid crystal display comprising:
a liquid crystal display panel including a polarizing plate disposed on at least one surface thereof;
a light guide plate disposed below the liquid crystal display panel and including reflective patterns which reflect light incident on the light guide plate toward the liquid crystal display panel; and
a composite polarizing sheet disposed between the liquid crystal display panel and the light guide plate and including:
a surface layer having a plurality of prism patterns which extend in a first direction and which are arranged substantially parallel to each other; and
a reflective polarizing layer having a transmission axis oriented in a second direction other than the first direction, wherein the second direction is one of substantially parallel to or substantially perpendicular to a polarizing axis of the polarizing plate, wherein the second direction is not substantially parallel to or not substantially perpendicular to the first direction; wherein the second direction interacts the first direction at substantially 45 degree or substantially 135 degree.

2. The liquid crystal display of claim 1, wherein the light guide plate includes a light incident surface through which light is incident on the light guide plate wherein the light guide plate tapers in thickness away from the light incident surface, and wherein the first direction is substantially parallel to the incident surface.

3. The liquid crystal display of claim 2, further comprising a prism sheet disposed between the composite polarizing sheet and the light guide plate and having a plurality of prism patterns extending in a direction substantially perpendicular to the first direction.

4. The liquid crystal display of claim 1, wherein the reflective patterns on the light guide plate are dot patterns spaced apart from each other.

5. The liquid crystal display of claim 4, further comprising a prism sheet disposed between the composite polarizing sheet and the light guide plate and having a plurality of prism patterns extending in a direction substantially perpendicular to the first direction, wherein the dot patterns are positioned at points where a plurality of first oblique lines having an angle other than a right angle relative to the first direction intersect a plurality of second oblique lines.

6. The liquid crystal display of claim 5, wherein the angle is about 45° and the plurality of second oblique lines are substantially orthogonal to the plurality of first oblique lines.

7. The liquid crystal display of claim 1, wherein the liquid crystal display panel includes a second polarizing plate disposed on a top surface thereof, wherein the second polarizing plate has a second polarizing axis, and wherein the second direction is substantially perpendicular to the second polarizing axis.

8. The liquid crystal display of claim 1, wherein the reflective patterns extend in a third direction and are arranged substantially parallel to each other.

9. The liquid crystal display of claim 8, wherein the surface layer is attached to a bottom surface of the reflective polarizing layer, wherein the third direction is substantially perpendicular to the first direction.

10. A liquid crystal display comprising:
a liquid crystal display panel including a liquid crystal molecular layer;
a light guide plate disposed below the liquid crystal display panel and having reflective patterns reflecting light incident on the light guide plate toward the liquid crystal display panel; and
a composite polarizing sheet disposed between the liquid crystal display panel and the light guide plate and including:
a surface layer having a plurality of prism patterns which extend in a first direction and are arranged substantially parallel to each other; and
a reflective polarizing layer having a transmission axis extending in a second direction other than the first direction, wherein the second direction coincides with the direction in which liquid crystal molecules in the liquid crystal molecular layer closest to the composite polarizing sheet are aligned, wherein the second direction is not substantially parallel to or not substantially perpendicular to the first direction; wherein the second direction interacts the first direction at substantially 45 degrees or substantially 135 degrees.

11. The liquid crystal display of claim 10, wherein the liquid crystal molecular layer is a twisted nematic liquid crystal molecular layer.

12. The liquid crystal display of claim 10, wherein the light guide plate includes a light incident surface through which light is incident on the light guide plate, wherein the light guide plate tapers in thickness away from the light incident surface, and wherein the first direction is substantially parallel to the incident surface.

13. The liquid crystal display of claim 12, further comprising a prism sheet disposed between the composite polarizing sheet and the light guide plate and having a plurality of prism patterns extending in a direction substantially perpendicular to the first direction.

14. The liquid crystal display of claim 10, wherein the reflective patterns on the light guide plate are dot patterns spaced apart from each other.

15. The liquid crystal display of claim 14, further comprising a prism sheet disposed between the composite polarizing sheet and the light guide plate and having a plurality of prism patterns extending in a direction substantially perpendicular to the first direction, wherein the dot patterns are positioned at points where a plurality of first oblique lines having an angle other than a right angle relative to the first direction intersect a plurality of second oblique lines.

16. The liquid crystal display of claim 15, wherein the angle is about 45° and the plurality of second oblique lines are substantially orthogonal to the plurality of first oblique lines.

17. A composite polarizing sheet comprising:
a surface layer having a plurality of prism patterns which extend in the first direction and are arranged substantially parallel to each other, and wherein the surface layer allows light passing therethrough to be oriented in a direction substantially normal thereto; and
a reflective polarizing layer having a transmission axis extending in a second direction other than the first direction and which transmits light having a first polarization oriented in the second direction while reflecting light having second polarization oriented in a direction other than the second direction, wherein the second direction is parallel to a polarizing axis of a polarizing plate to which light is transmitted through the reflective polarizing layer, wherein the second direction is not substantially parallel to or not substantially perpendicular to the first direction; wherein the second direction interacts the first direction at substantially 45 degrees or substantially 135 degrees.

18. The composite polarizing sheet of claim 17, wherein the reflective polarizing layer includes a first layer containing a birefringent material and a second layer adjacent to the first layer and composed of at least one material having a different refractive index from the first layer.

* * * * *